May 3, 1955 K. R. DURST 2,707,508
BOLT LOCK AND RETAINER
Filed July 6, 1951

Inventor
Kenneth R Durst
By
Atty-

United States Patent Office 2,707,508
Patented May 3, 1955

2,707,508

BOLT LOCK AND RETAINER

Kenneth R. Durst, Troy, Ohio, assignor to The B. F. Goodrich Company, New York, N. Y., a corporation of New York Application July 6, 1951, Serial No. 235,528

1 Claim. (Cl. 151—68)

This invention relates to a fitting for securing a bolt or similar article against rotation and axial displacement from a member through which the bolt extends.

The fitting of this invention is particularly useful for retaining the tie bolts of aircraft wheels of the type having mating annular sections which are assembled side to side. Such wheels are usually installed for operation in a manner such that the heads of the tie bolts are not readily accessible, but by the use of a fitting as provided by this invention it is possible to assemble or disassemble the wheels very conveniently. Another important advantage of this fitting is that it prevents the tie bolts from damaging and mutilating the portions of the wheels through which they extend, the wheels usually being formed of a light metal such as magnesium or aluminum which is much softer than the metal of the bolts.

The invention will be further described with reference to the accompanying drawings in which.

Figure 1:
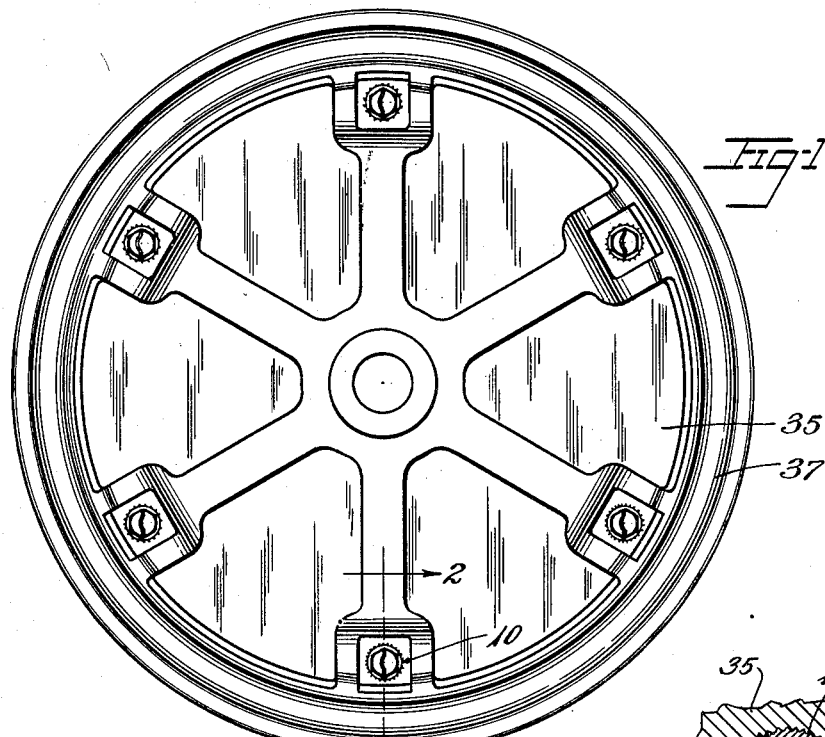
Fig. 1 is a side elevation of a wheel structure embodying a fitting of this invention.

The fitting is indicated generally by the numeral 10 and it is desirable that it be formed of a hard, durable metal such as case-hardened steel. The fitting has a generally cylindrical, tubular shaped body. At one end 11 it is formed with a relatively narrow opening 12 which extends axially into the fitting. The opening 12 widens abruptly inside the fitting to define a shoulder 13 and to define a relatively wide cavity 14 which extends from the shoulder 13 to an end 15 of the fitting. The fitting is adapted to receive a bolt 18 in the manner shown in Fig. 2, viz., with the shank of the bolt extending through opening 12 and projecting from end 11 of the fitting and with the head of the bolt 18 fitting into the cavity 14 and abutting shoulder 13.

Figure 4:
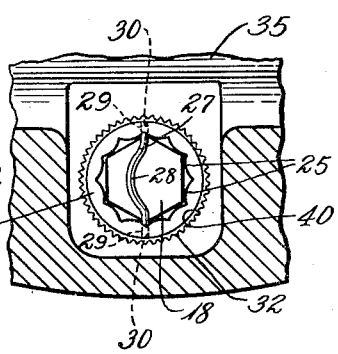
Fig. 4 is a view, on an enlarged scale, taken on the line 4—4 of Fig. 2.

The fitting illustrated is designed for retaining a hex-head bolt such as bolt 18 although a bolt having a head of any polygonal or non-circular shape may be used with the fitting, provided the head of the bolt will fit into the cavity 14. To prevent the bolt from being rotated in the cavity the inner surface of the wall surrounding the cavity is provided with a multiplicity of ribs 25 which extend longitudinally along the inner surface of the cavity and which protrude into the cavity. These ribs are arranged so that they tangentially engage the sides of the bolt head adjacent the several corners of the head of the bolt as the head is slid axially into the cavity and they prevent the head from being rotated relative to the fitting. Fig. 4 best illustrates the manner in which the head of the bolt is engaged by the ribs 25.

Figure 2:
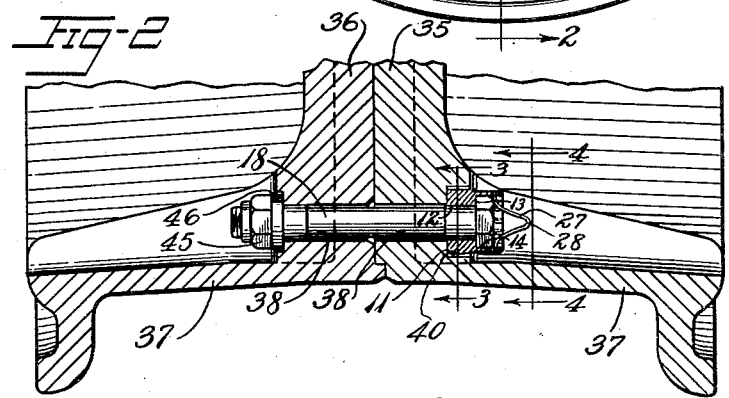
Fig. 2 is a cross-sectional view, on an enlarged scale, taken on the line 2—2 of Fig. 1.

The cavity 14 is somewhat deeper than the thickness of the head of the bolt so that when the head of the bolt is abutting shoulder 13 there is a portion of the cavity between the head of the bolt and end 15 of the fitting to receive a resilient, wire spring 27 (see Figs. 2 and 4). After the bolt is inserted into the fitting the spring 27 is releasably engaged with end 15 of the fitting and bears against the head of the bolt to prevent the head from sliding backwards out of the cavity and to prevent the bolt from being moved axially relative to fitting. The spring 27 is a relatvely narrow strip of spring steel which is doubled over to form an arched center 28 and has ends 29—29 which are flared outwardly in opposite directions. The spring is engaged with the fitting by squeezing the sides of the spring to urge the ends 29—29 together, and then these ends are inserted into cavity 14 and allowed to spring apart. The spring is positioned in the cavity before it is released so that the ends 29—29 snap into two holes 30—30 which are drilled through the wall of the cavity diametrically opposite each other and quite close to end 15 of the fitting. These holes serve to fasten the spring in the cavity. In order to remove the bolt from the fitting the ends 29—29 are first disengaged from the holes 30—30 and then the bolt is slipped out of the fitting through the cavity.

Figure 3:
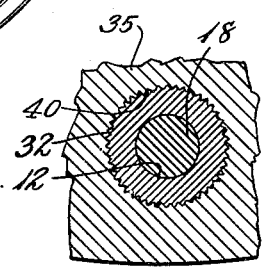
Fig. 3 is a view, on an enlarged scale, taken on the line 3—3 of Fig. 2.
Figure 5:
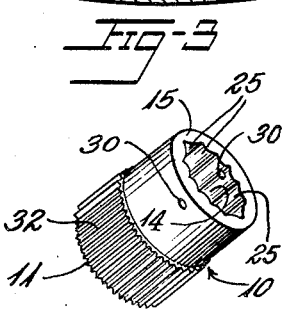
Fig. 5 is a perspective view of a fitting formed according to this invention.

The fitting is also formed with a plurality of relatively sharp serrations 32 on its outside surface adjacent end 11. These serrations are provided to engage a member into which the fitting is inserted in the manner shown in Figs. 2 and 3, so that the fitting is anchored securely in the member. These figures show details of portions of the wheel structure of Fig. 1 and show in detail the way in which the serrations 32 engage the wheel structure.

The wheel structure shown in Fig. 1 is a split-type wheel formed of two generally annular members 35 and 36 which are fastened together side to side. Each member has a continuous peripheral rim flange 37 and when the annular members are assembled the flanges 37 fit together in mating relation to form a tire-receiving channel around the wheel. The annular wheel members 35 and 36 are fastened together by several bolts 18 which are spaced apart circumferentially of the wheel. Each bolt extends transversely through a pair of aligned holes 38, 38 in the two wheel members close to the rim flanges and each of these bolts is engaged with the wheel member 35 by a fittiing 10.

In this wheel structure, the end 11 of each fitting 10 is fitted into a counter-bore 40 formed around its respective hole 38 in wheel member 35. The counter-bore 40 before insertion of the fitting is about equal in diameter to the root diameter of the serrations 32 around end 11 so that the fitting must be forced into the counter-bore. The wheel member 35 of the wheel structure illustrated is formed of a relatively soft, light metal such as aluminum or magnesium or the like so that the sarrations 32 on the fitting bite into and become embedded in the sides of the counter-bore and thereby anchor the fitting firmly in the counterbore.

Ordinarily each fitting will be positioned in its respective counter-bore 40 before the bolts 18 are inserted through the fittings. To complete the assembly of the wheel structure after the fittings are properly located, the bolts 18 are inserted through the fittings and are locked in the fittings by the spring 27. The wheel member 36 is then fitted over the bolts and a nut 45 and a washer 46 screwed onto the end of each of the bolts as shown in Fig. 2. The wheel structure is easily disassembled by unscrewing nut 45 and removing member 36. A tire supported in the rim channel formed by flanges 37 may be conveniently changed in this manner.

The fitting is ordinarily formed of a material harder than the article which it supports and the fitting may be inserted into objects which are formed of material substantially as hard or harder than the fitting by pressing the fitting into a counter-bore therein or other opening of appropriate size. The fitting may be also installed in such a way that only the head of the bolt fits into cavity 14 and the shank of the bolt projects from end 15 of the fitting and in this event it is not necessary to use a spring 27. Alternatively, a nut may be supported in the fitting so that a bolt may be screwed into the nut.

Variations may be made without departing from the scope of the invention as it is defined in the claims.

I claim:

In an aircraft wheel, a fitting for securing a bolt having a polygonal-shaped head and a shank against rotation and axial displacement from a wheel-member of material softer than the bolt and through which the bolt is adapted to extend, the fitting comprising a substantially cylindrical body, a multiplicity of closely-spaced axial serrations on the exterior of the body adapted to deformably engage said softer wheel-member when the fitting is assembled therewith, an axial opening in the body at one end of the fitting adapted to receive the shank of a bolt, and a cavity inside the body at the opposite end of the fitting in communication with said opening to receive the head of the bolt, a shoulder in the body at the junction of said cavity and said opening against which shoulder the head of the bolt is adapted to abut, the cavity being defined by an internal surface formed of a series of ribs disposed axially of the fitting each of the ribs protruding into the cavity and each having a convexly curved surface for tangentially engaging the sides of the bolt head adjacent the corners thereof to restrain rotation of the bolt relative to the wheel-member, the number of ribs being at least twice the number of sides of the bolt head so that the bolt head may be engaged by the ribs in a multiplicity of different positions relative to the cavity, the axial length of the cavity being greater than the thickness of the head of the bolt, a pair of diametrically-opposed holes through the body in the portion of the cavity extending beyond the head of the bolt, and a spring engaged in said holes to obstruct the cavity to prevent axial displacement of the bolt from said cavity, the spring being a thin narrow resilient member having a pair of leg portions connected by a central arched portion, the pair of leg portions extending axially into the cavity from said arched portions and flaring resiliently from each other toward said opposed holes and the leg portions terminating in outwardly turned ends which ends project through said holes and are maintained in engagement therewith by the spring force exerted by said leg portions toward said holes.

References Cited in the file of this patent

UNITED STATES PATENTS

| Number | Name | Date |
| --- | --- | --- |
| 231,588 | Kernochan | Aug. 24, 1880 |
| 797,545 | Ette | Aug. 15, 1905 |
| 1,432,243 | Harris | Oct. 17, 1922 |
| 1,616,286 | Stimpson | Feb. 1, 1927 |
| 2,144,553 | Simmonds | Jan. 17, 1939 |
| 2,188,596 | Hobert | Jan. 30, 1940 |
| 2,361,706 | Pavlecka et al. | Oct. 31, 1944 |
| 2,363,006 | Klaus | Nov. 21, 1944 |
| 2,452,262 | Rosan | Oct. 26, 1948 |
| 2,515,886 | Moline | July 18, 1950 |
| 2,544,387 | Kerr | Mar. 6, 1951 |
| 2,626,837 | Wilson | Jan. 27, 1953 |

FOREIGN PATENTS

| Number | Country | Date |
| --- | --- | --- |
| 744,072 | France | Apr. 11, 1933 |